United States Patent
Hayford et al.

(10) Patent No.: US 6,357,563 B1
(45) Date of Patent: Mar. 19, 2002

(54) BRAKE ASSEMBLY WITH AIR COOLING SYSTEM

(75) Inventors: Roy Lee Hayford, Redford, MI (US); Neil Williams, Henllys Cwmbran (GB); Juergen Dreher, Muelheim-Kaerlich (DE); Christos T. Kyrtsos, Southfield, MI (US); Wilfried Giering, Mendig (DE); Gerald D. Anderson, Oxford, MI (US); David Brademeyer, Centerville, OH (US)

(73) Assignee: Meritor Heavy Vehicle Technology, L.L.C., Troy, MI (US)

( * ) Notice: Subject to any disclaimer, the term of this patent is extended or adjusted under 35 U.S.C. 154(b) by 0 days.

(21) Appl. No.: 09/821,187

(22) Filed: Mar. 29, 2001

(51) Int. Cl.[7] ................................................ F16D 65/78
(52) U.S. Cl. .................................. 188/264 A; 188/71.6
(58) Field of Search ............................ 188/71.6, 264 A, 188/264 AA, 264 R

(56) References Cited

U.S. PATENT DOCUMENTS

| | | | | |
|---|---|---|---|---|
| 3,347,344 A | * | 10/1967 | Troy | ..................... 188/264 AA |
| 3,623,576 A | * | 11/1971 | Waring | ................. 188/264 AA |
| 4,050,536 A | * | 9/1977 | Pristash | ................ 188/264 AA |
| 4,440,270 A | * | 4/1984 | Ross | .................... 188/264 AA |
| 4,561,522 A | | 12/1985 | Dayen | |
| 4,771,822 A | | 9/1988 | Barbosa | |
| 4,805,747 A | | 2/1989 | Moedinger et al. | |
| 4,872,487 A | | 10/1989 | Riesen | |
| 4,901,826 A | | 2/1990 | Preiss | |
| 4,979,597 A | | 12/1990 | Mehlitz | |
| 5,121,818 A | | 6/1992 | McComic | |
| 5,317,880 A | | 6/1994 | Spears | |
| 5,366,046 A | * | 11/1994 | Klaue | ........................ 188/71.6 |
| 6,006,869 A | | 12/1999 | Rancourt et al. | |

* cited by examiner

Primary Examiner—Christopher P. Schwartz
(74) Attorney, Agent, or Firm—Carlson, Gaskey & Olds

(57) ABSTRACT

A vehicle braking system includes a device for cooling the components of the brake assembly. The air source that is normally used to activate the brake assembly components is coupled with a plurality of flexible conduits that direct air toward one or more of the brake assembly components. A high velocity air nozzle preferably is provided at the end of each conduit. The air from the compressed air source is maintained in a compressed state through the conduits and decompresses as it exits the discharge nozzles. The decompression of the air through the nozzles results in cooling the air and the nearby brake components at which the air is directed.

12 Claims, 1 Drawing Sheet

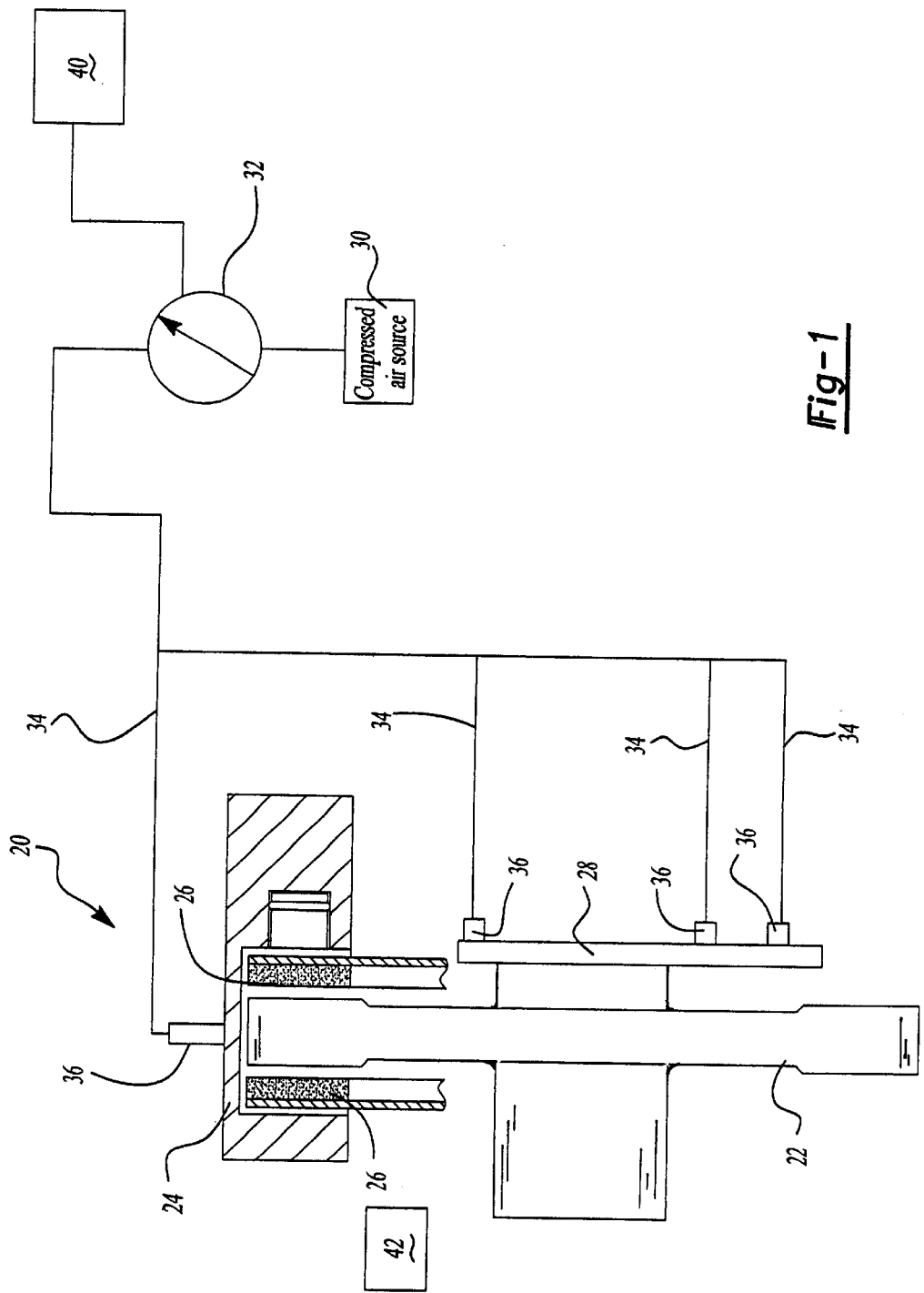

BRAKE ASSEMBLY WITH AIR COOLING SYSTEM

BACKGROUND OF THE INVENTION

This invention generally relates to vehicle brake systems. More particularly, this invention relates to a vehicle brake system that includes using air to cool portions of the brake system.

Vehicle brake systems typically include friction pads that engage a rotating member such as a rotor or drum. The components of the brake assembly naturally heat up during a braking application because of the friction between the rotating and stationary parts. Under most circumstances some heat build up does not pose any real problem. Under some conditions, however, excessive heat buildup may compromise b rake performance over the lifetime of the system. Further, brake systems in heavy duty vehicles are subjected to greater stresses than most passenger vehicles.

There is a need for an effective cooling system that can prevent excessive heat buildup in a brake assembly. One example proposed arrangement is shown in U.S. Pat. No. 3,347,344. In that patent a separate air reservoir is provided to direct air onto a rotor during braking applications. The arrangement in that patent has certain drawbacks, which resulted in it not being adopted in the marketplace. For example, a separate reservoir adds additional cost and weight to a vehicle, which is something that vehicle designers and manufacturers are striving to avoid.

Prior to this invention, a cost-effective and efficient brake cooling arrangement has not been developed. This invention utilizes compressed air from a compressed air source that is already associated with the braking system. The use of such compressed air is new because it provides a cooling effect for a brake assembly.

SUMMARY OF THE INVENTION

In general terms, this invention is a device that uses compressed air for cooling components of a brake assembly. A system designed according to this invention includes a rotating member and brake pads that engage the rotating member to apply a braking force. A compressed air source is connected with at least one conduit that maintains the air in a compressed state while it is within the conduit. A discharge nozzle at one end of the conduit directs the air at a portion of the brake system such that the air decompresses at it passes through the discharge nozzle, which reduces the temperature of the air and facilitates cooling the components of the brake assembly.

In the preferred embodiment, the conduit that carries the compressed air is a flexible tube. The preferred discharge nozzle is a high velocity air nozzle. The preferred embodiment also includes a solenoid actuated valve that selectively allows air to flow from the compressed air source to the conduit.

The various features and advantages of this invention will become apparent to those skilled in the art from the following detailed description of the currently preferred embodiment. The drawing that accompanies the detailed description can be briefly described as follows.

BRIEF DESCRIPTION OF THE DRAWINGS

The FIGURE schematically illustrates a brake system designed according to this invention.

DETAILED DESCRIPTION OF A PREFERRED EMBODIMENT

A brake assembly 20 includes a conventional rotor 22 that rotates with a wheel of a vehicle in a conventional manner. A brake caliper 24 supports friction pads 26 of the brake assembly in a conventional fashion. During a braking application, the friction pads 26 are moved into engagement with a surface on the rotor 22 to slow down the vehicle wheel in a conventional fashion. A backing plate 28 is associated with the rotor 22.

A compressed air source 30 supplies air for actuatng the components of the brake assembly 20 on the vehicle. Such compressed air sources are well known and commonly used in heavy duty vehicles. A selectively activated valve 32 preferably is coupled with the compressed air source 30. The preferred embodiment includes a solenoid actuated valve 32. A plurality of conduits 34 extend from the valve 32 and terminate in a corresponding plurality of discharge nozzles 36. The conduits 34 preferably are flexible tubes such as rubber hoses. The conduits 34 maintain the air in a compressed state (as it is received from the compressed air source 30). The air from the air source 30 that travels through the conduits 34 preferably does not experience any decompression until it exits the discharge nozzles 36.

The illustrated example includes discharge nozzles 36 supported on the brake caliper structure 24 and the backing plate 28. This arrangement provides cooling air directly onto the rotor 22 and the pads 26. Other arrangements are within the scope of this invention.

In one example, the conduits 34 are 1½ inch flexible hoses and the discharge nozzles 36 are ⅟₁₆ of an inch air nozzle outlets. The preferred embodiment includes high velocity discharge nozzles 36. This ensures that air flowing through the discharge nozzles is directed at the brake components at high velocity.

As the compressed air leaves the conduits 34 through the discharge nozzles 36, the decompress ion of the air results in a reduction of air temperature. In one example, the conduits 34 have a two inch inside diameter and the discharge nozzles 36 have a ¼ inch opening. This results in the air flow changing from a rate of 2 meters per second in the conduits 34 to a rate of 100 meters per second at the discharge nozzles 36. By maintaining the compression of the air within the conduits 34, the cooling effect of the air exiting the discharge nozzles 36 is maximized.

A significant advantage to this invention is that it utilizes compressed air from the compressed air source 30 that is already present on most heavy duty vehicles. Typical heavy duty vehicle brake systems have hydraulically activated components and include an air reservoir that is capable of holding 60 to 80 gallons and maintaining air at approximately 100 pounds per square inch. The valve 32 is selectively activated by a controller 40 to allow air to flow from the air source 30 through the conduits 34 to the discharge nozzles 36.

The controller 40 can be a selectively programmed portion of an onboard vehicle electronic controller or can be a dedicated circuit or microprocessor, for example. The controller 40 preferably is programmed to operate the valve 32 such that air is supplied to the braking components during a braking application and under any circumstances where the temperature of one or more of the braking components passes a preselected threshold. Accordingly, the preferred embodiment includes a temperature sensor 42 strategically placed within the brake assembly 20 to communicate temperature information to the controller 40 so that the valve 32 can be operated as needed.

Given this description, those skilled in the art will be able to choose from among commercially available microprocessors or to design custom circuitry or software to realize the functions of the controller 40 described in this specification.

Additionally, given this description, those skilled in the art will be able to choose from among commercially available discharge nozzles and types of conduit to realize this invention.

The preceding description is exemplary rather than limiting in nature. Variations and modifications to the disclosed embodiment may become apparent to those skilled in the art that do not necessarily depart from the purview and spirit of this invention. The scope of legal protection given to this invention can only be determined by studying the following claims.

We claim:

1. A vehicle brake system, comprising:
   a rotating member;
   at least one brake pad adapted to engage the rotating member during a braking application;
   a compressed air source;
   at least one conduit coupled with the compressed air source, the conduit maintaining air in a compressed state within the conduit; and
   a discharge nozzle at one end of the conduit that directs the air at a portion of the brake system such that the air is decompressed as it exits the nozzle.

2. The system of claim 1, wherein there are a plurality of conduits and a plurality of discharge nozzles and wherein the conduits are flexible tubing.

3. The system of claim 1, wherein the discharge nozzle comprises a high velocity air nozzle.

4. The system of claim 1, including a valve between the compressed air source and the conduit that is selectively activated to allow air to flow from the compressed air source into the conduit.

5. The system of claim 4, wherein the valve includes a solenoid.

6. The system of claim 1, including a controller that selectively controls airflow from the compressed air source into the conduit under selected conditions.

7. The system of claim 6, wherein the controller permits air flow into the conduit during a braking application or when a temperature of a portion of the brake system exceeds a selected threshold value.

8. The system of claim 7, including a temperature sensor that detects a temperature of at least one selected portion of the brake system and communicates temperature information to the controller.

9. A device for cooling components in a brake system, comprising:
   a compressed air source;
   a plurality of flexible conduits coupled with the compressed air source;
   at least one valve between the compressed air source and the conduits that controls air flow from the source to the conduits; and
   a discharge nozzle at one end of each of the conduits such that air from the compressed air source remains in a compressed state within the conduits and is decompressed as the air exits each nozzle.

10. The device of claim 9, including a controller that selectively activates the valve under selected conditions.

11. The device of claim 10, including a temperature sensor that detects the temperature of at least a portion of a brake system and communicates temperature information to the controller and the controller responsively activates the valve.

12. The system of claim 9, wherein the discharge nozzles comprise high velocity air nozzles.

* * * * *